UNITED STATES PATENT OFFICE.

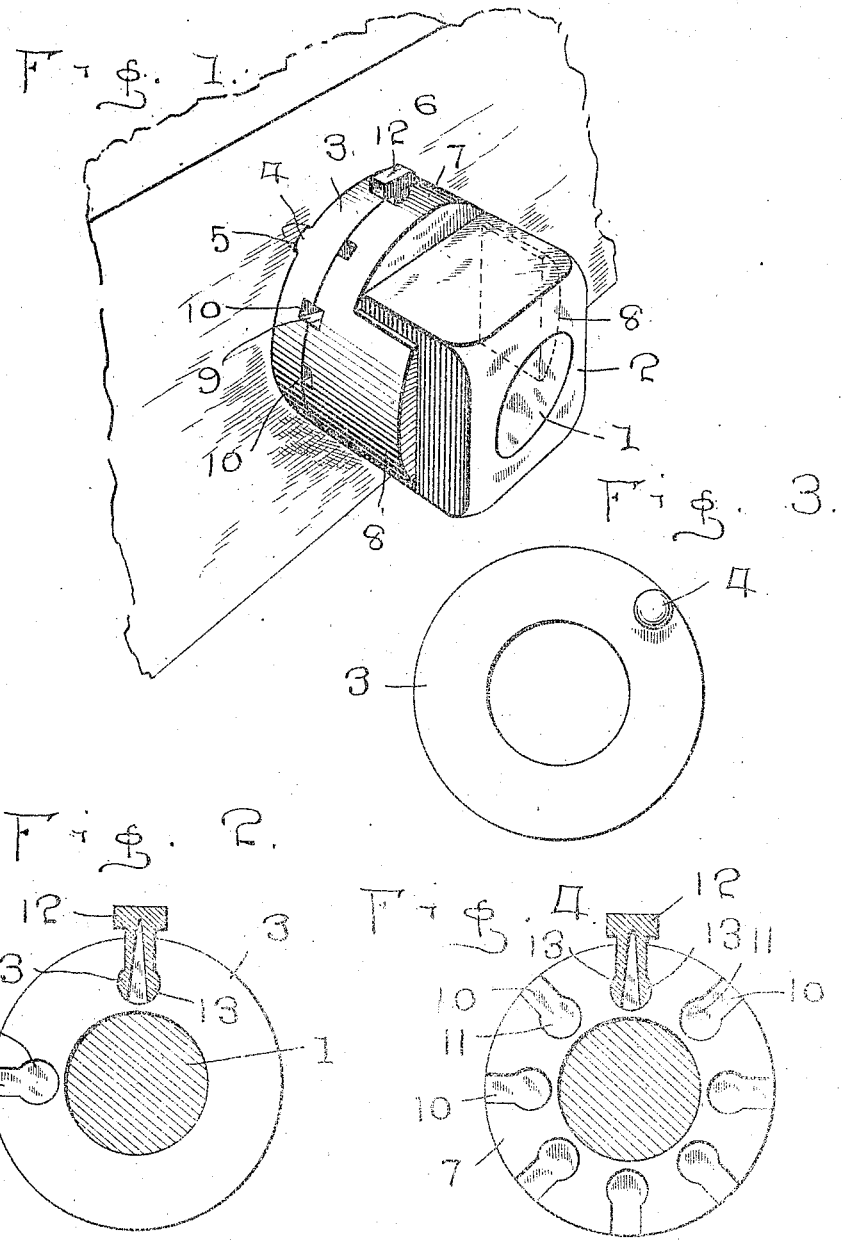

JOHN J. BROWN, OF MARTINS MILLS, TEXAS.

NUT-LOCK.

No. 906,377.  Specification of Letters Patent.  Patented Dec. 8, 1908.

Application filed July 7, 1908. Serial No. 442,336.

*To all whom it may concern:*

Be it known that I, JOHN J. BROWN, a citizen of the United States, residing at Martins Mills, in the county of Van Zandt and State of Texas, have invented certain new and useful Improvements in Nut-Locks; and I do hereby declare the following to be a full, clear, and exact description of the invention, such as will enable others skilled in the art to which it appertains to make and use the same.

This invention relates to new and useful improvements in nut locks and it is primarily an object of the invention to provide a novel device of this character engaging the sides of the nut to be held against rotation.

It is also an object of the invention to provide a novel device of this character wherein are employed a series of washers adapted to be interlocked, one of said washers engaging a surface of an article through which the co-active bolt passes while a second washer engages the sides of the nut engaging the bolt.

It is also an object of the invention to provide a novel device of this character which will be simple in construction, efficient and advantageous in practice and comparatively inexpensive to manufacture.

With the above and other objects in view, the invention consists of the details of construction and in the novel arrangement and combination of parts to be hereinafter more particularly referred to.

In describing the invention in detail, reference will be had to the accompanying drawings forming part of this specification wherein like characters of reference denote corresponding parts in the several views, and in which, Figure 1 is a view in perspective illustrating the invention in applied position. Fig. 2 is a view partly in section and partly in plan of one of the washers employed in conjunction with the invention. Fig. 3 is a view in bottom plan of the washer shown in Fig. 2, and, Fig. 4 is a view partly in section and partly in bottom plan of a second washer employed in the invention.

In the drawings, 1 denotes a bolt of any ordinary or preferred construction which is adapted to be engaged by the nut 2 angular in cross section.

Before the nut 2 is applied to the bolt 1, said bolt is surrounded by a washer 3 having formed on its outer face, or the face which contacts with the article 6 with which the bolt and nut coöperates with a lug 4 which is adapted to be seated within a suitable recess 5 in the article. This engagement of the lug 4 will hold the washer 3 against rotation as is believed to be apparent. The bolt 1 is then surrounded by a second washer 7 which has projecting upwardly from its face opposed to the nut 2 when applied and positioned at opposed points thereon, the broad lugs 8 between which the nut 2 is adapted to snugly fit. The opposed faces of the washers 3 and 7 are provided with radially disposed recesses 9 and 10, respectively, adapted to register one with the other and extending inwardly from the peripheries of the washers. Each of the recesses terminates in an enlarged approximately circular portion 11. The recesses 10 within the washer 7 are arranged at intervals entirely therearound while the washer 3 has a limited number of recesses, in this instance shown as two and arranged at distances apart of about one-fourth of the washer. When certain of these recesses 9 and 10 are in register there is inserted therein the split locking pin 12, said pin being of such thickness as to contact with the walls of both of the recesses 9 and 10. The inner end of this pin is provided with outwardly projecting segmental lugs 13 which, owing to the natural resiliency possessed by the split shank of the pin, will extend within the enlarged portions 11 of the recesses and be held effectually against accidental displacement. Therefore, it will be seen that the pin 12 locks the washer 7 and the washer 3, and as the washer 3 is held against movement through the medium of the lug 4, the broad lugs 8 of the washer 7 engaging opposed sides of the nut 2 will lock said nut to the bolt 1.

I claim:

1. In combination with a bolt and its nut; of a washer surrounding the bolt beneath the nut, said washer being provided on its outer surface with a lug, a second washer surrounding the bolt above the first named washer, the opposed faces of the washers being provided with recesses extending inwardly from the peripheries of the washers, said recesses terminating at their lower ends in circular portions, a pin insertible within certain of the recesses of the washers when in register, said pins having outwardly projecting lugs at their lower ends, curved to fit the circular portion at the lower ends of the recesses, and means carried by the second named washer to engage the sides of the nut.

2. In combination with a bolt and its nut; of a washer surrounding the bolt beneath the nut, a lug projecting from the outer surface of the washer, a second washer surrounding the bolt above the first named washer, the opposed faces of the washers being provided with radial recesses having their inner ends enlarged and formed substantially circular in cross section, a pin insertible within certain of the recesses when in register, said pin being split and having outwardly extending lugs to fit within the enlarged portions of the recesses, said lugs being curved to fit the enlarged inner ends of the recesses, and means carried by the second named washer to engage the sides of the nut.

In testimony whereof I have signed my name to this specification in the presence of two subscribing witnesses.

JNO. J. BROWN.

Witnesses:
W. D. DEEN,
J. F. NEFF.